(12) United States Patent
Gingrich (10) Patent No.: US 8,733,853 B2
(45) Date of Patent: May 27, 2014

(54) ARC-RESISTANT SWITCHGEAR ENCLOSURE WITH DOOR LATCH MECHANISM

(71) Applicant: Central Electric Manufacturing Company, Fulton, MO (US)

(72) Inventor: Paul W. Gingrich, Fulton, MO (US)

(73) Assignee: Central Electric Company, Fulton, MO (US)

( * ) Notice: Subject to any disclaimer, the term of this patent is extended or adjusted under 35 U.S.C. 154(b) by 0 days.

(21) Appl. No.: 13/648,598

(22) Filed: Oct. 10, 2012

(65) Prior Publication Data
US 2014/0097734 A1    Apr. 10, 2014

(51) Int. Cl.
*E05C 9/10* (2006.01)

(52) U.S. Cl.
USPC .......................................... 312/216; 312/222

(58) Field of Classification Search
USPC .................... 312/215–219, 222; 49/394–395; 292/32–33, 137, 36, 156–158; 403/353; 200/43.16, 50.01, 50.02, 200/50.12, 50.15
See application file for complete search history.

(56) References Cited

U.S. PATENT DOCUMENTS

| | | | | |
|---|---|---|---|---|
| 3,175,873 | A * | 3/1965 | Blomquist et al. | 312/296 |
| 3,213,219 | A * | 10/1965 | Mrenna et al. | 200/50.15 |
| 3,882,291 | A * | 5/1975 | Chiboroski | 200/50.16 |
| 4,864,466 | A | 9/1989 | Gasparetto | |
| 5,120,094 | A * | 6/1992 | Eaton et al. | 292/159 |
| 5,542,720 | A * | 8/1996 | Fleming | 292/32 |
| 5,905,244 | A | 5/1999 | Smith et al. | |
| 6,089,168 | A | 7/2000 | Dunlap et al. | |
| 6,561,604 | B2 * | 5/2003 | Leccia et al. | 312/326 |
| 6,637,784 | B1 * | 10/2003 | Hauber et al. | 292/300 |
| 6,746,092 | B2 * | 6/2004 | Leccia et al. | 312/222 |
| 6,871,602 | B2 * | 3/2005 | McCracken et al. | 109/59 R |
| 6,907,830 | B2 | 6/2005 | Guinan et al. | |
| 6,971,322 | B2 * | 12/2005 | DuBois et al. | 109/24.1 |
| 7,558,052 | B1 | 7/2009 | Coomer et al. | |
| 7,592,541 | B2 | 9/2009 | Adducci et al. | |
| 7,871,137 | B2 * | 1/2011 | Schulz et al. | 312/296 |
| 8,020,950 | B2 * | 9/2011 | Reuter et al. | 312/220 |
| 8,419,141 | B2 * | 4/2013 | Niedzwiecki | 312/216 |
| 2011/0122588 | A1 * | 5/2011 | Wu et al. | 361/759 |
| 2012/0200096 | A1 * | 8/2012 | Galloway et al. | 292/145 |

\* cited by examiner

*Primary Examiner* — Hanh V Tran
(74) *Attorney, Agent, or Firm* — Geoffrey A. Mantooth

(57) ABSTRACT

An arc-resistant switchgear enclosure has an interior compartment with a door opening and a vent outlet. The door is mounted to close the door opening. The door receives pins that extend from the enclosure. The pins have stops thereon that are received by a keyhole in the latch member. The latch member can slide so as to position the pin in a large opening in the keyhole and unlatch the door or a narrow opening in the keyhole to latch the door. The latch members are ganged so that a handle operates all of the latch members.

10 Claims, 7 Drawing Sheets

ARC-RESISTANT SWITCHGEAR ENCLOSURE WITH DOOR LATCH MECHANISM

FIELD OF THE INVENTION

The present invention relates to arc-resistant switchgear enclosures and in particular to door latch mechanism therefor.

BACKGROUND OF THE INVENTION

Arc-resistant switchgear enclosures house medium voltage electrical switchgear components such as potential transformers (PT), fuses, circuit breakers, etc. A typical enclosure has plural compartments, with each compartment housing one or more electrical components. Medium voltage generally is in the 5-38 KV range.

Such medium voltage electrical components can experience arc faults. An arc fault creates an explosion of hot gasses which can endanger nearby personnel and equipment.

In order to protect nearby personnel and equipment, enclosures are metal clad and are designed to contain the explosion and vent the explosive gasses in a controlled manner. Personnel and equipment at the front, sides and rear of an enclosure are protected by the walls of the enclosure. The explosive gasses are typically vented up into a plenum which channels the explosive gasses to a safe area, such as a building exterior.

Access to each compartment in the enclosure is provided by a door. Enclosures have front compartments that are designed to be easily accessible. The front compartments and their respective doors typically face walkways. Personnel access the front compartments in order to repair or replace switchgear components located therein.

The door of an enclosure is a potentially vulnerable component because the door by its very nature is designed to open. To prevent the door from being blown off of the enclosure during an arc fault, the door must be latched securely closed and remain closed even when exposed to an interior arc fault.

A door blown loose by an arc fault explosion is dangerous. Doors flying 50 feet or more have been observed.

In the prior art, medium voltage arc-resistant switchgear enclosures use either bolts or latches with concealed latching mechanisms to maintain the doors in closed positions. If bolts are used, loosening all of the bolts to open the door and then tightening all of the bolts to secure the door is tedious and time consuming. If concealed latching mechanisms are used, then it is not possible for personnel to visibly verify that all latching points are fully engaged.

SUMMARY OF THE INVENTION

An arc-resistant switchgear enclosure comprises walls defining an interior compartment, with one wall having a door opening that communicates with the compartment, the compartment having a vent outlet that communicates with a vent plenum. Pins extend from the one wall adjacent to the door opening. Each pin has a free end and a stop thereon. A door is sized to close the door opening. The door has pin openings for receiving the free ends of the pins. At least one elongated latch member has keyhole openings that receive the pin free ends. Each keyhole has a large portion that allows the respective pin stop to pass therethrough and a narrow portion that prohibits the respective pin stop from passing therethrough. The latch member is slidingly coupled to the door so that the latch member can selectively move between a latched position and an unlatched position. In the unlatched position, the large portion of the keyhole is aligned with the respective pin; in the latched position, the narrow portion of the keyhole is aligned with the respective pin.

In accordance with one aspect, the door is swingably mounted to the enclosure by hinges.

In accordance with another aspect, the pins comprise bolts, with the free ends of the pins comprising bolt heads. The bolts have threaded ends that are received by threaded couplings in the one enclosure wall.

In accordance with another aspect, there are at least two latch members ganged together so as to move between the latched position and the unlatched position in unison.

In accordance with another aspect, a handle is provided for moving the latch members between the latched and unlatched positions.

In accordance with still another aspect, the door is swingably mounted to the enclosure by hinges. The pins comprise bolts, with the free ends of the pins comprising bolt heads. The bolts have threaded ends that are received by threaded couplings in the one enclosure wall. There are at least two latch members ganged together so as to move between the latched position and the unlatched position in unison. A handle is provided for moving the latch members between the latched and unlatched positions.

In accordance with still another aspect, the door has openings and bosses for receiving the pins. The latch member bears on the bosses. The door has spacers extending out therefrom and engaging the latch members.

DESCRIPTION OF THE PREFERRED EMBODIMENT

Figure 1:
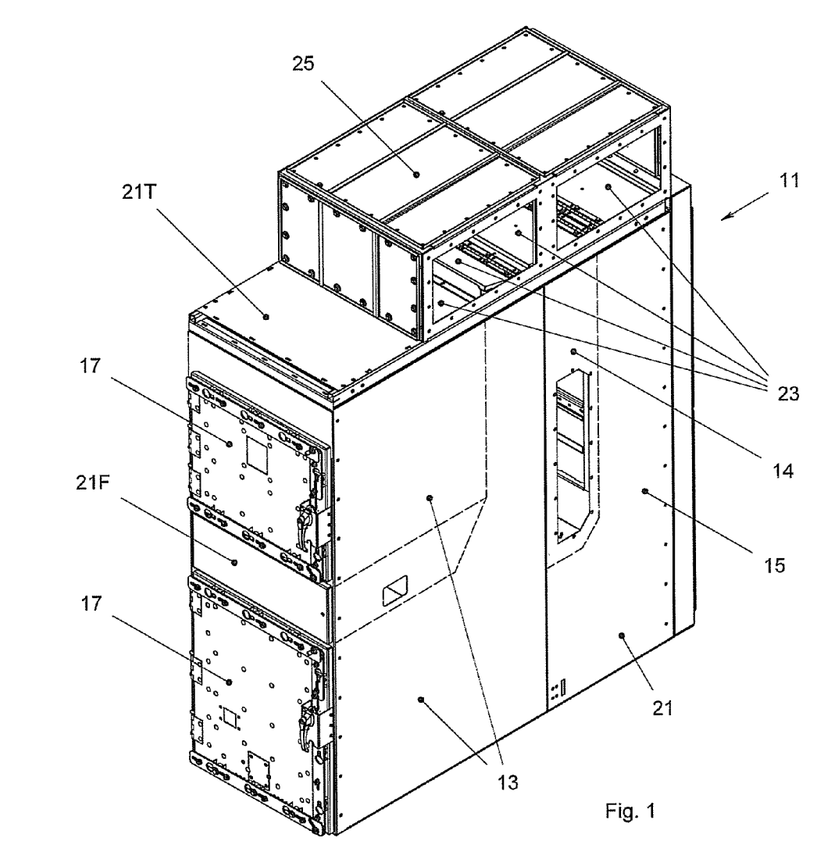
FIG. 1 is a perspective view of an arc-resistant switchgear enclosure, in accordance with a preferred embodiment.
Figure 2:
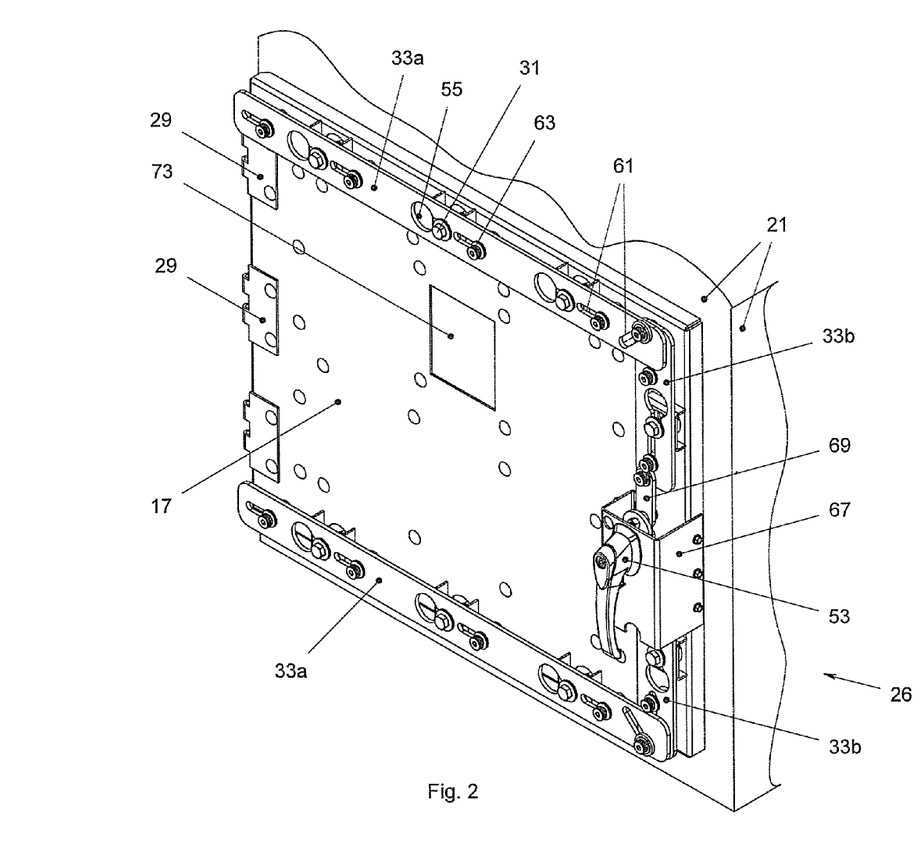
FIG. 2 is a perspective front view of the door of the enclosure in the closed and latched position.
Figure 3:
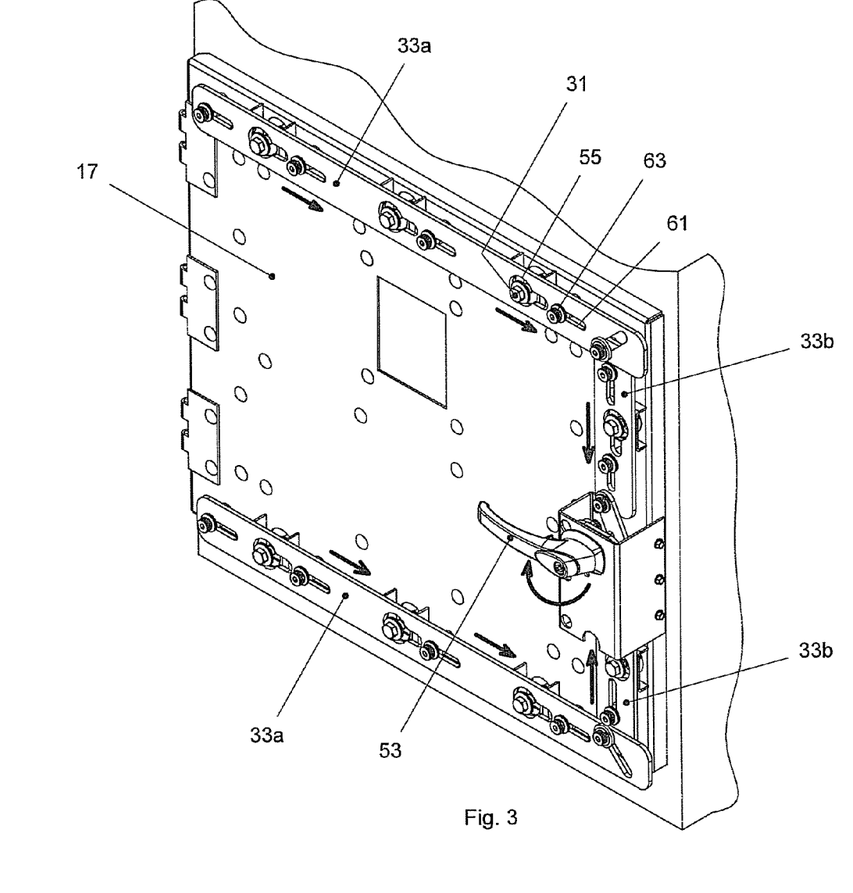
FIG. 3 is a perspective front view of the door of the enclosure in the closed and unlatched position.
Figure 4:
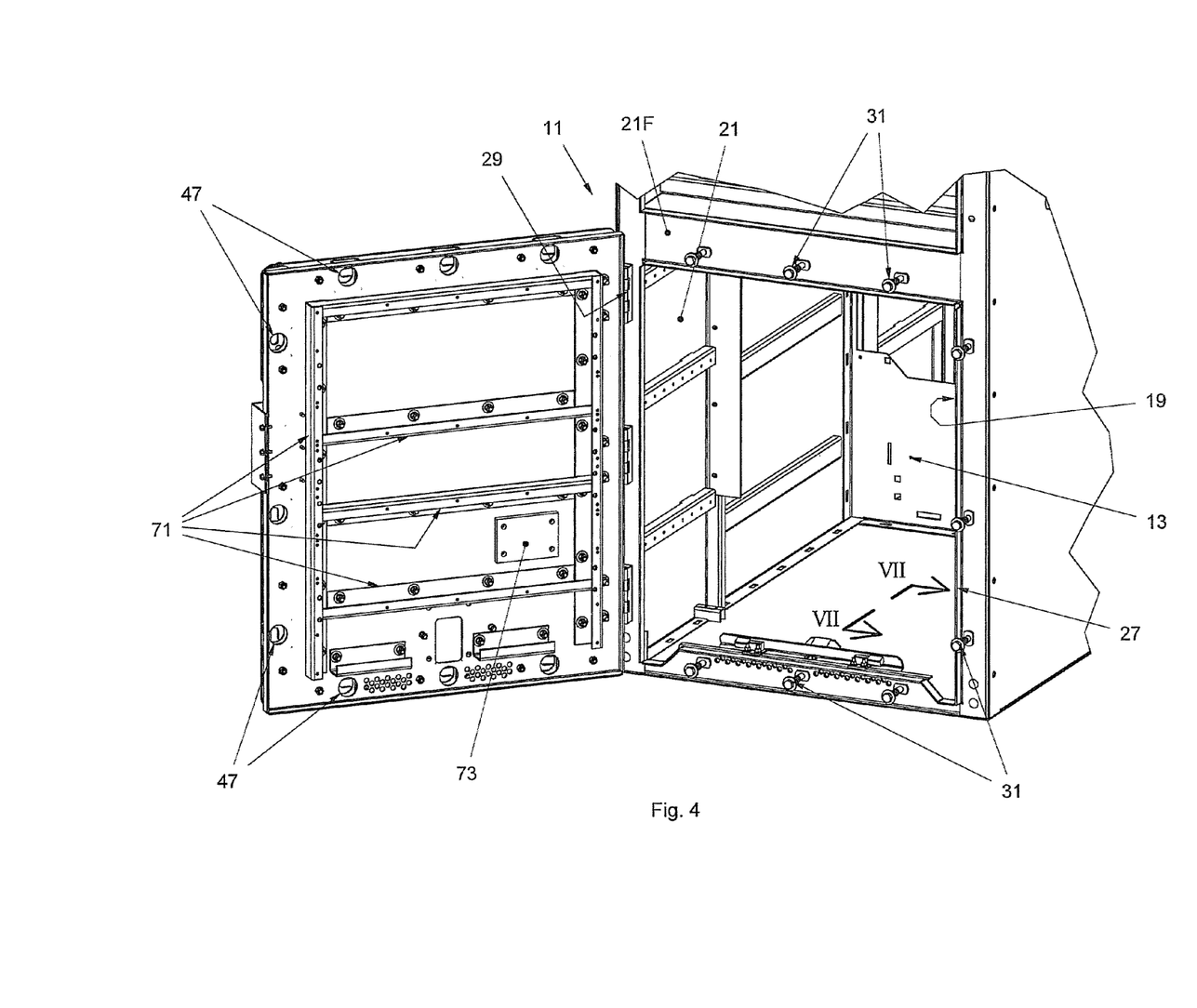
FIG. 4 is a perspective view showing a compartment inside of the enclosure with the door open.

In FIG. 1, there is shown an arc-resistant switchgear enclosure 11 with plural compartments 13, 14, 15. There are two front compartments 13 (shown generally by dashed lines), with each compartment accessible by a respective door 17. The front compartments 13 may have different dimensions, wherein the front doors 17 will likewise have different dimensions. (FIGS. 2 and 3 show the upper front door, while FIG. 4 shows the lower front door.) There is also a middle compartment 14 and a rear compartment 15. The compartments 13, 14, 15 are used to house switchgear components such as potential transformers, fuses, circuit breakers, bus bars, etc.

While the switchgear is in service, the door 17 is normally closed and latched. If access to a compartment is required, the door 17 is opened to reveal a door opening 19 (see FIG. 4) in the enclosure 11.

The enclosure has walls 21 that enclose the compartments 13, 15 and that are capable of containing and directing an arc fault explosion therein. In the preferred embodiment, the walls are metal clad. In the case of a rectangularly shaped enclosure, there is a front wall 21F, side walls, a top wall 21T, a bottom wall and a rear wall. One or more outlet vents 23 are located in the top wall 21T of the enclosure. A plenum 25 is located above the enclosure and the outlet vents 23. The compartment or compartments 13, 14, 15 communicate with the outlet vents 23 and the plenum 25.

Referring to FIGS. 2 and 3, the doors 17 each have a latch mechanism 26. Each door 17, when closed and latched, can not only withstand an arc fault explosion, but can also prevent the escape of hot gasses. Instead, the explosion gasses are routed or channeled through the respective vent outlet 23 and into the plenum 25.

The door latch mechanism 26 provides the advantage of allowing an operator to visually check, from the outside of the enclosure, that the door is properly latched. This provides safety assurance to personnel working near the enclosure. In addition, the tightness of the latch mechanism can be easily adjusted from the outside of the enclosure. Latch tightness is adjusted at the factory. With the latch mechanism, labor costs are reduced in manufacturing because of the ease of adjustment.

The door latch mechanism 26 will now be described in more detail. In the description herein, the particular door 17 discussed is a front door, meaning the door is located at what is considered in the industry to be the front of the enclosure. The front wall 21F is the side that faces a walkway or path for personnel and equipment. Typically front compartments are accessed more frequently than rear compartments.

As shown in FIG. 4, the door 17 is open, showing the door opening 19 and the compartment 13 inside of the enclosure 11. The door opening is lined with a seal 27 such as a gasket.

The door 17 is mounted to the enclosure by hinges 29. The hinges are along one side of the door. The door 17 swings on the hinges between open and closed positions.

The door latch mechanism includes pins 31 (see FIG. 4) extending from the enclosure front wall 21F and latch bars 33 located on the door 17 (see FIGS. 2 and 3), which latch bars selectively admit and secure the pins 31. The pins 31 are located outside of the seal 27.

Figure 7:
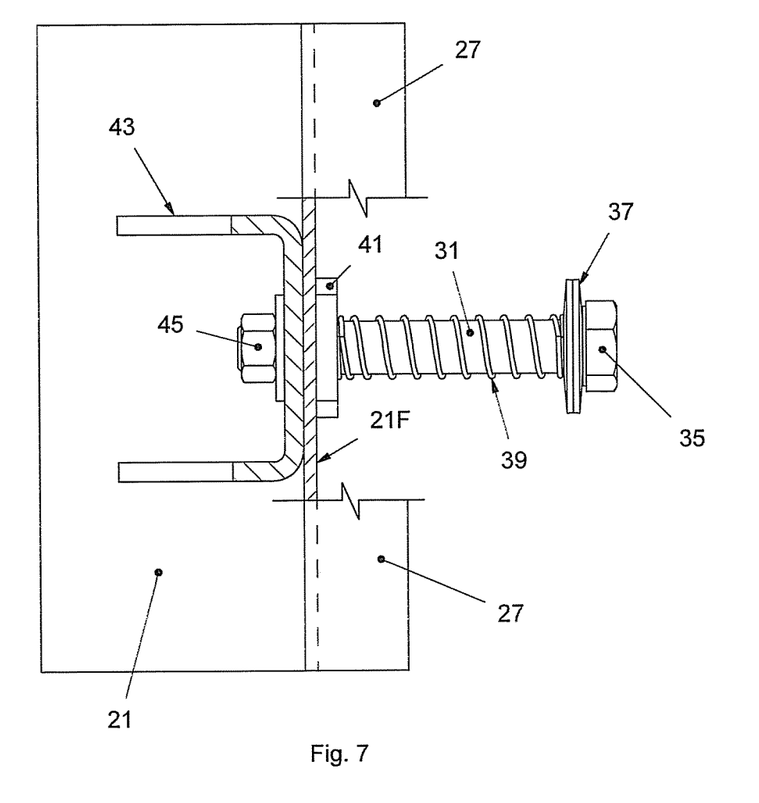
FIG. 7 is a cross-sectional view of a pin, taken along lines VII-VII of FIG. 4.

As shown in FIG. 4, the other three non-hinge sides of the door opening 19 have pins 31 protruding out. Referring to FIG. 7, each pin 31 has a free end 35 with a stop 37 thereon. In the preferred embodiment, the pins 31 are hex head bolts and the stops 37 are Belleville washers. The hex head forms the free end 35 of the pin. The washers 37 are maintained in the position abutting the bolt head by a helical spring 39 located between the enclosure and the washers. The threaded end of each bolt is received by a threaded opening in the enclosure. In the preferred embodiment, the threaded opening is provided by a weld nut 41.

The pins 31 extend from the front wall 21F of the enclosure. To reinforce the front wall by the pins, gussets 43 are provided. As shown in FIG. 7, the gussets 43 are welded to interior surfaces of the front wall and the adjacent side wall.

The spacing between the washer stops 37 and the enclosure front wall 21 is adjusted by turning the bolt 31. Once the desired spacing is achieved, a nut 45 is placed in the threaded end of the bolt, inside of the enclosure compartment 13. The nut serves as a keeper to secure the bolt 31 in its adjusted position.

The door 17 has openings 47 (see FIG. 4) along its non-hinge sides, which openings are large enough to admit the free ends 35 of the pins 31 and the washers 37. Aligned with each opening 47 is an inverted "U" shaped bracket 49. The bracket 49, located on the exterior of the door, serves as a standoff for other portions of the latch. The bracket 49 has an opening 51 large enough to admit the free end of the respective pin 31 and the washers 37.

The door 17 has one or more latch bars 33 extending along each non-hinge side to receive the pins. In the preferred embodiment shown, there are top and bottom latch bars 33a and two side latch bars 33b (see FIG. 2). A handle 53 is between the two side latch bars 33b.

Each latch bar 33 is made from a metal plate and is elongated. Keyhole shaped openings 55 are provided therein for receiving the pins and their washers. Each keyhole opening has a large diameter circular hole 57 and a slot 59 extending from the circular hole in a longitudinal direction. Each latch bar also has slot opening 61 formed therein for mounting to the door. Most of the slot openings 61 are longitudinal. At those ends where the latch bars overlap one another, the slots are diagonal with respect to the longitudinal axis of the latch bar.

Figure 5:
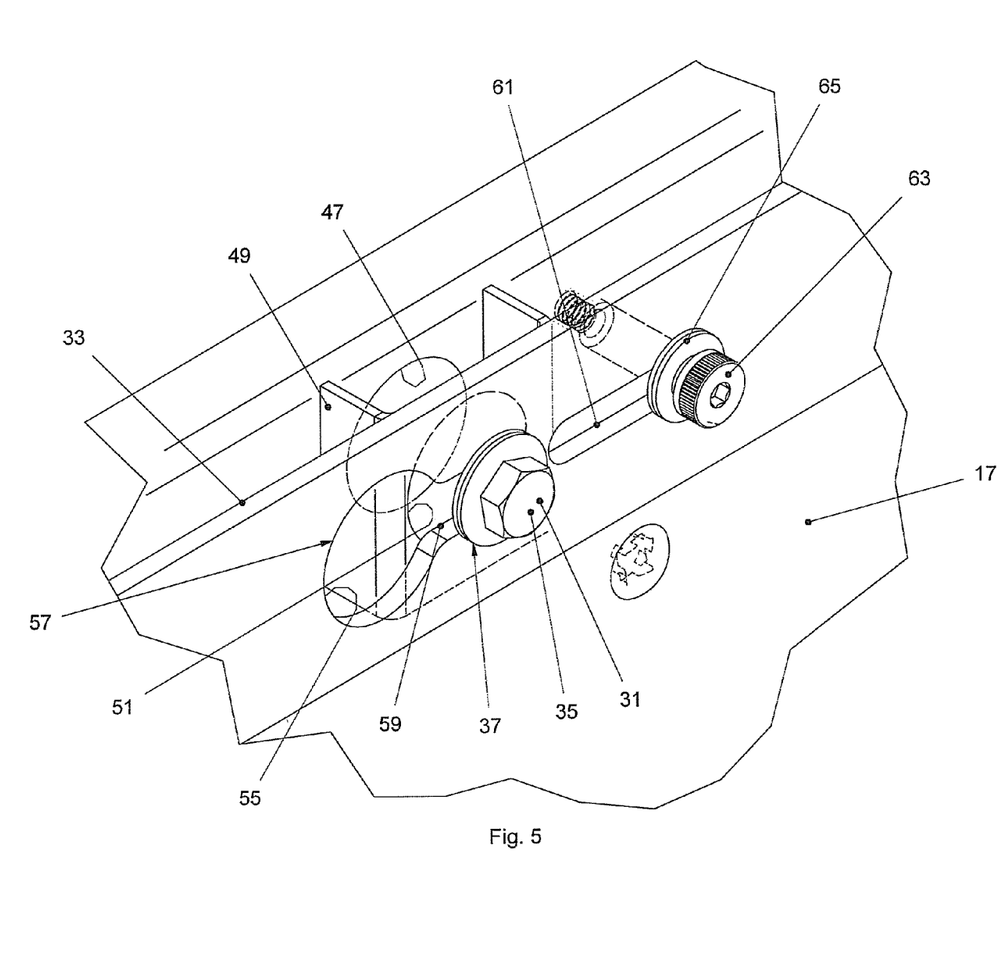
FIG. 5 is a perspective detailed view of the latch bar and pin arrangement shown in the latched position.
Figure 6:
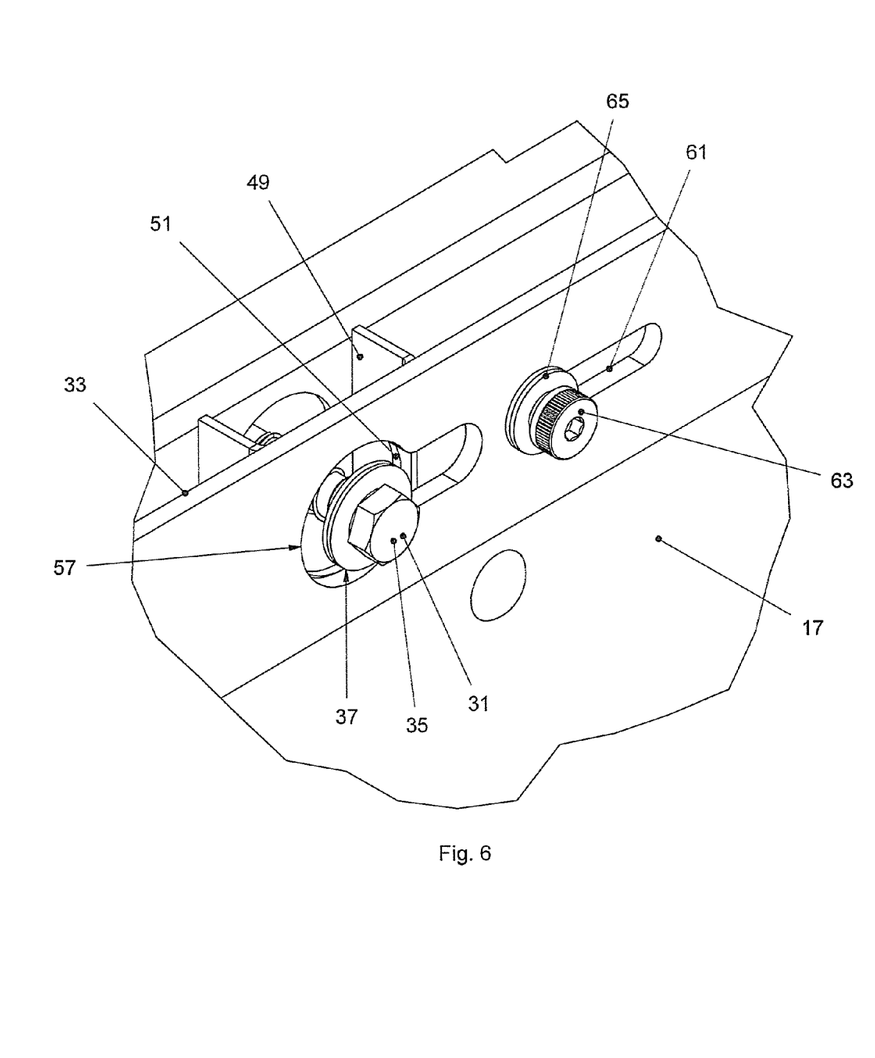
FIG. 6 is a perspective detailed view of the latch bar and pin arrangement shown in the unlatched position.

Each latch bar 33 is positioned across the brackets 49 and is mounted to the door by spacer bolts 63. The bolts 63 extend out from the door. Each spacer bolt 63 thus extends through one or more washers 65, an elongated slot 61 in the latch bar 33 and through the door, where the threaded end of the bolt is secured with a nut. When installed on the door, the latch bar 33 is between the brackets 49 and the spacer bolt washer 65. The latch bar 33 can move back and forth along its longitudinal axis between unlatched and latched positions, as shown in FIGS. 2 and 3. All other directions of movement of the latch bar are restrained. In the unlatched position (see FIGS. 3 and 6), the large opening 57 of the respective keyhole 55 is aligned with the respective bracket opening 51 and the pin 31 can pass freely therethrough. In the latched position (see FIGS. 2 and 5), the respective narrow slot 59 of the keyhole is aligned with the respective bracket opening 51 and the pin 31 is prevented from passing through the latch bar 33 and the door 17. The door 17 is thus latched or secured to the enclosure front wall 21F.

At the factory, the tightness of the door fit can be adjusted. With no interior nuts 45 on the pins 31, the door is closed and latched and the bolt heads 35 of the pins 31 are tightened. However, the latch bars 33 must be able to move longitudinally. Therefore once the pins 31 are tightened, they may be loosened slightly to allow the latch bars to move longitudinally. The adjustment is made from the outside, with the door closed. This is unlike other door latch arrangements where the door must be opened in order to make the adjustment. Once the pins 31 are adjusted, the door is opened and nuts 45 (see FIG. 7) are then secured to the interior ends.

The handle 53 (see FIGS. 2 and 3) is part of a handle mechanism that operates the door 17 and the latch mechanism 26. The handle mechanism rotates to latch and unlatch. The handle mechanism has the handle 53 mounted to a handle bracket 67. Connecting members 69 extend from the handle to each adjacent latch bar 33b.

With the door in the latched position as shown in FIG. 2, the latch bars 33 are positioned with the pins 31 in the narrow slot portion 59 of the respective keyholes 55. Thus, the door 17 is held closed by the pins 31 and their washers 37, restraining outward movement of the latch bar 33 and the remainder of the door. This latch arrangement provides a strong, multipoint coupling that maintains the door in the closed position even when subjected to an arc fault explosion in the respective compartment. The door is secured on all four sides by the hinges 29 and the pins 31. The door stays closed while the explosive gas is vented into the vent 23 and plenum 25.

An operator can visually check the door for proper latching. The operator looks to see that all of the pins 31 are properly located in the narrow slot 59 of the keyhole 55. In addition, the operator can check the orientation of the handle 53.

As shown in FIG. 4, the door has some reinforcing in the form of "C" shaped beams 71 that are bolted to the inside door surface. The beams extend vertically and horizontally. A window 73 made of polycarbonate or other transparent material can be provided to allow viewing of the compartment.

In spite of the strong coupling, unlatching the door is simple. The handle 53 is rotated approximately 90 degrees. Referring to the orientation shown in FIGS. 2 and 3, this moves the two side latch bars 33*b* toward the handle (the upper side latch bar moves down and the lower side latch bar moves up) and also moves the top and bottom latch bars 33*a* to the right. This latch movement aligns the large openings 57 of the keyholes 55 with the pins 31 and their washers 37. The door is now unlatched and can be opened. The pin heads and washers 37 pass through the keyholes 55, the bracket opening 51 and the door opening 47 to clear the door.

To latch the door, the procedure is reversed, namely the door is closed and the pin heads and washers enter the door and bracket openings and the large openings 57 of the keyholes 55. The handle 53 is then rotated in the opposite direction, moving the latch bars so that the pins are now located in the narrow slots 59 of the keyholes.

Thus, the door can be closed and latched, or unlatched and opened, through the action of the handle.

The foregoing disclosure and showings made in the drawings are merely illustrative of the principles of this invention and are not to be interpreted in a limiting sense.

The invention claimed is:

1. An arc-resistant switchgear enclosure, comprising:
   a) walls defining an interior compartment, with one wall having a door opening that communicates with the compartment, the door opening lying in a plane, the compartment having a vent outlet that communicates with a vent plenum;
   b) pins extending from the one wall adjacent to the door opening, the pins extending perpendicular to the door opening plane, each pin having a free end and a stop thereon;
   c) a door sized to close the door opening, the door having pin openings for receiving the free ends of the pins;
   d) at least one elongated latch member having keyhole openings that receive the pin free ends, each keyhole opening having a large portion that allows the respective pin stop to pass therethrough and a narrow portion that prohibits a respective pin stop from passing therethrough, the latch member slidingly coupled to the door so that the latch member can selectively move between a latched position and an unlatched position; in the unlatched position, the large portion of the respective keyhole is aligned with the respective pin; in the latched position, the narrow portion of the respective keyhole is aligned with the respective pin, wherein the latch member and the free end of the respective pin in the respective keyhole opening are visible from an exterior of the enclosure.

2. The arc-resistant switchgear enclosure of claim 1, wherein the door is swingably mounted to the enclosure by hinges.

3. The arc-resistant switchgear enclosure of claim 1, wherein the pins comprise bolts, with the free ends of the pins comprising bolt heads, the bolts having threaded ends that are received by threaded couplings in the one enclosure wall.

4. The arc-resistant switchgear enclosure of claim 1, wherein there are at least two latch members ganged together so as to move between the latched position and the unlatched position in unison, the latch members moving in non-parallel directions with respect to one another.

5. The arc-resistant switchgear enclosure of claim 4, further comprising a handle for moving the latch members between the latched and unlatched positions.

6. The arc-resistant switchgear enclosure of claim 1, wherein:
   a) the door is swingably mounted to the enclosure by hinges;
   b) the pins comprise bolts, with the free ends of the pins comprising bolt heads, the bolts having threaded ends that are received by threaded couplings in the one enclosure wall;
   c) there are at least two latch members ganged together so as to move between the latched position and the unlatched position in unison, the latch members moving in non-parallel directions with respect to one another;
   d) a handle for moving the latch members between the latched and unlatched positions.

7. The arc-resistant switchgear enclosure of claim 1, wherein:
   a) the door has bosses oriented with the pin openings, the pins extending through the pin openings and the bosses when the door is closed, the latch member bearing on the bosses;
   b) the door has spacers extending out therefrom and engaging the latch member and allowing the latch member to slide.

8. The arc-resistant switchgear enclosure of claim 1, wherein the pin free ends are also received by keyhole openings and a latch member slidingly coupled to the door.

9. The arc resistant switchgear enclosure of claim 1 further comprising a seal between the door and the one wall, the door and the deal sealing the interior compartment when the door is closed, the pins located exteriorly of the seal.

10. The arc-resistant switchgear enclosure of claim 1, wherein the door has four sides which hinges mounted along one side, the pins extending into the pin openings along the remaining three sides of the door, there being a latch member along each of the door sides with pin openings, the latch members ganged together so as to move between the latched position and the unlatched position in unison.

* * * * *